United States Patent
Sahu et al.

(10) Patent No.: US 12,204,924 B2
(45) Date of Patent: Jan. 21, 2025

(54) SCORECARD DRIVEN FRAMEWORK FOR MIGRATING VM-BASED APPLICATIONS TO CONTAINER-BASED MICROSERVICES

(71) Applicant: Dell Products L.P., Round Rock, TX (US)

(72) Inventors: Sudhansu Sahu, Bangalore (IN); YungChin Fang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 445 days.

(21) Appl. No.: 17/583,244

(22) Filed: Jan. 25, 2022

(65) Prior Publication Data
US 2023/0236861 A1     Jul. 27, 2023

(51) Int. Cl.
G06F 9/455    (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

2020/0057663 A1* 2/2020 Abbott ............... G06F 16/2228

OTHER PUBLICATIONS

Lubin, Eric, VM2Docker: Automating Conversion from Virtual Machine to Docker Container, Massachusetts Institute of Technology, Feb. 2015.

* cited by examiner

*Primary Examiner* — Eric C Wai
(74) *Attorney, Agent, or Firm* — Jackson Walker L.L.P.

(57) ABSTRACT

A disclosed method provides a migration service, executable within a hypervisor, configured to calculate, based on a plurality of migration tenets, a migration value for an application running in a VM supported by the hypervisor. If the calculated migration value exceeds a threshold value, a migration tool is invoked to migrate the virtualized application to a functionally equivalent containerized application. The migration value for a VM based application may be determined by calculating a plurality of tenet scores corresponding to a plurality of migration tenets. Each tenant score may equal a sum of scores for each of one or more attributes associated with each tenet. Weightings may be assigned to each tenet such that the migration value is the sum of weighted tenet values. The tenets may include, as non-limiting examples, a security tenet, a density/performance tenet, and a high availability tenet.

14 Claims, 2 Drawing Sheets

SCORECARD DRIVEN FRAMEWORK FOR MIGRATING VM-BASED APPLICATIONS TO CONTAINER-BASED MICROSERVICES

TECHNICAL FIELD

The present disclosure relates to [ ].

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cloud based applications may be deployed as virtual machines (VMs) or, more recently, as containers. Each VM includes its own OS kernel whereas a containerized application shares a kernel with the host and with other containers. This distinction reflects a tradeoff between application isolation and higher application density. A VM is more fully isolated from the host and other VM than a comparable container, but the container may be deployed more densely and may perform better, i.e., faster, than a VM.

Because VMs and containers can co-exist within a single namespace, application developers and system administrators may be required to evaluate the costs and benefits of both architectural approaches for each application based on various characteristics and objectives of the application. This evaluation includes subjective considerations and is made even more difficult when users have more than one VM and/or containerizaton alternatives to choose from. For example, users who run container PODs in vSphere with Kubernetes may do so with vSphere Native PODs or Tanzu Kubernetes Grid (TKG) Clusters.

Commercially available VMs evolved before containers and, accordingly, the VM vs container decision is frequently presented as a decision regarding if and when to replace an existing VM-based application with a containerized deployment.

SUMMARY

In accordance with teachings disclosed herein, common problems associated with determining whether to migrate a VM-implemented application to a functionally equivalent containerized application are addressed by methods and systems disclosed herein, which provide a migration service, executable within a hypervisor running on a host, and configured to calculate, based on a plurality of migration tenets, a migration value for an application running in a VM supported by the hypervisor.

If a migration value calculated by the migration service exceeds a threshold value, a migration tool may be invoked to migrate the virtualized application to a containerized application that includes one or more containers configured to provide functionality equivalent or substantially equivalent to the virtualized application.

Calculating the migration value for a VM may include calculating a plurality of tenet values, including a tenet value corresponding to each of a plurality of migration tenet. In some embodiments, weightings are assigned to each tenet and the migration value is calculated as a sum of weighted tenet values. The tenets employed to determine the migration value may include, as non-limiting examples, a security tenet, a density/performance tenet, and a high availability (HA) tenet, and a disaster recovery (DR) tenet. A higher tenet value may indicate that containerization of the VM-based application is potentially beneficial.

Each tenet may be associated with a corresponding group of attributes. In such embodiments, calculating the tenet value for a particular tenet includes assigning an attribute score to each attribute in the applicable group and summing all of the attribute scores for the group.

In some embodiments, the maximum score for each tenet, prior-to applying any weighting, is 100 and the maximum predetermined score for any of the tenet's attribute is 100/N where N indicates the number of attributes associated with the tenet. For example, if there are five attributes associated with a security tenet, the maximum score for any security attribute is 100/5 or 20.

The possible scores for one or more attributes may be confined to a group of two or more predetermined values, in which case assigning an attribute score to an attribute comprises assigning one of the predetermined attribute values. Binary or yes/no attributes may have two possible values, e.g., 0 and 100/N. Other attributes may have three or more possible values. Three possible values may be used to indicate that an attribute is either: not required (score of 0), mandatory (score of 100/N), or desirable (50% of mandatory score). For example, if there are four attributes associated with a density/performance tenet and each attribute can have one of three scores, the three scores might be 0 when the attribute is not required, 25 when the attribute is mandatory, and 25/2, or some other value intermediate between 0 and 25, when the attribute is desirable but not strictly mandatory.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
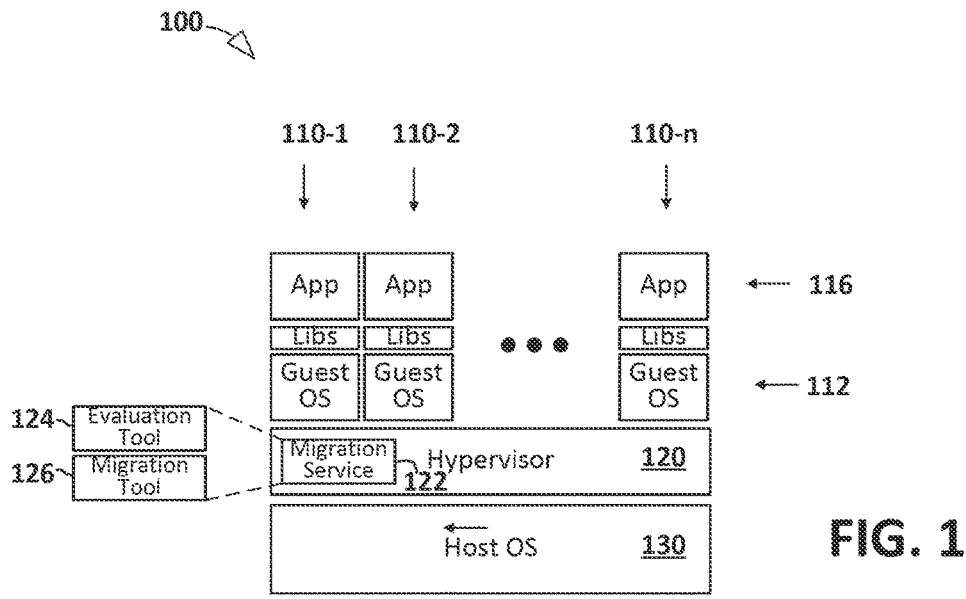
FIG. 1 illustrates a host system supporting a VM platform including a hypervisor with a migration service in accordance with disclosed teachings.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a host 100 configured as a VM platform in accordance with disclosed teachings for assessing and possibly migrating a VM-based application to a container-based application.

The host 100 illustrated in FIG. 1 includes a plurality of virtual machines 110 each of which includes a corresponding application 116 executing within a guest operating system 112. Each virtual machine 110 is supported by a hypervisor 120 and a host OS 130, as will be familiar to those of ordinary skill in the field of virtual machines.

The hypervisor 120 illustrated in FIG. 1 includes a migration service 122 in accordance with teachings disclosed herein for evaluating and, when appropriate, migrating VM based applications to containerized applications. The migration service 122 illustrated in FIG. 1 includes an evaluation tool 124 and a migration tool 126. In at least one embodiment, migration service 122 is a runtime service for evaluating the active virtual machines 110 for consideration as containerize applications. Evaluation tool 124 is described in one more detail with respect to FIG. 2. In some embodiments, migration tool 126 leverages an existing VM-to-container migration application such as VM2DOCKER. See, e.g., E. Lubin, VM2DOCKER: Automating the Conversion from Virtual Machine to Docker Container, Massachusetts Institute of Technology (February 2015).

Figure 2:
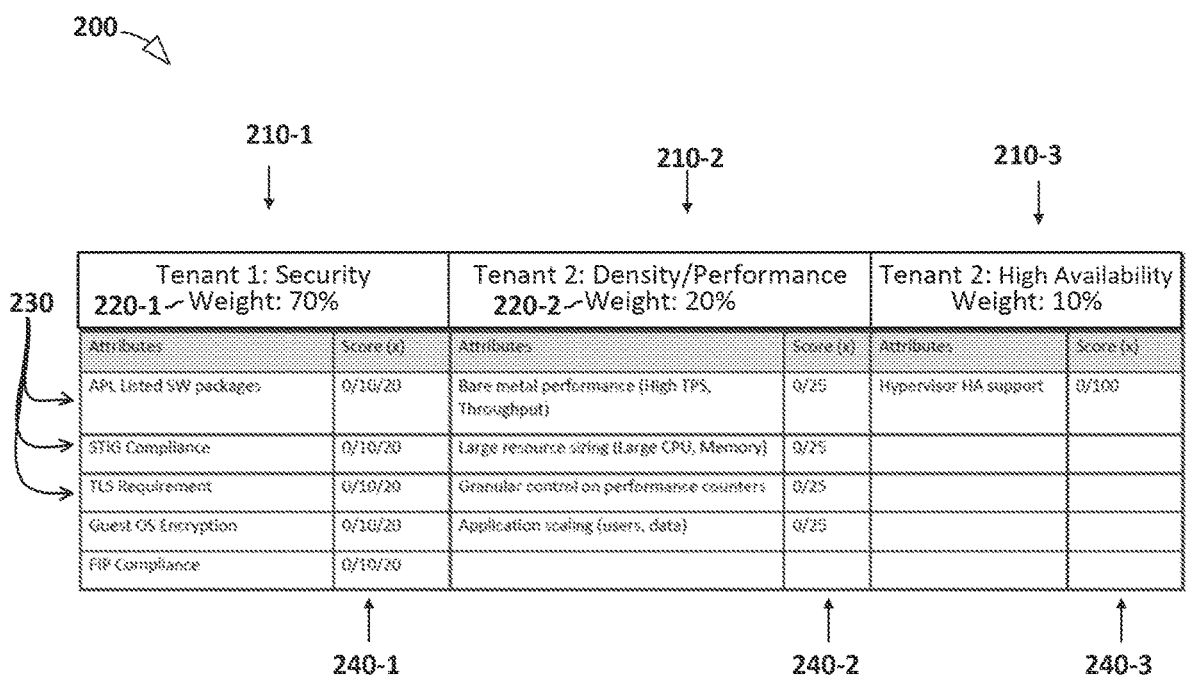
FIG. 2 illustrates an exemplary migration evaluation template in accordance with disclosed teachings.

Referring now to FIG. 2, an exemplary migration evaluation template 200, suitable for use in conjunction with disclosed teachings, is illustrated. Template 200 provides a framework for determining a single numeric value, referred to herein as the migration value, for targeting VM-based applications for container migration based on a discrete set of migration tenets each of which includes its own discrete set of one or more attributes.

Although template 200 may include any number of tenets 210, the exemplary template 200 illustrated in FIG. 2 identifies three migration tenets, 210-1 through 210-3, each of which corresponds to a distinct motivation for migrating a VM-based application. The specific tenets 210 depicted in FIG. 3 include a security tenet 210-1, a density/performance tenet 210-2 and a high availability tenet 210-3, but template 200 may include more, fewer, and or different tenets 210 in other embodiments.

Each tenet 210 in the illustrated template 200 is associated with a corresponding set of one or more attributes 230. The illustrated template 200 identifies five attributes 230 associated with security tenet 210-1, four attributes associated with density/performance attribute 210-2, and one attribute associated with high availability attribute 210-3. Clearly, however, both the number of tenets 210 and number of attributes 230 for each tenet may vary among different implementations. A tenant score may be determined for each tenet 210 based on an evaluation of the application with respect to various attributes germane to the applicable tenet 210 and the migration value may be based on the tenet scores. In the illustrated template 200, a weighting 220 is identified for each tenet 210 and, in such embodiments, the migration value may be based on a sum of weighted tenet scores. The weightings 220 illustrated in FIG. 2 add up to 100%, but other embodiments may have different weightings.

Template 200 also indicates, for each attribute 230, the permissible scores 240 that an attribute can have. As depicted in FIG. 2, there are three permissible scores 240-1 for each attribute 230 associated with security tenet 210-1, two permissible scores 240-2 associated with each attribute 230 associated with density/performance tenet 210-2, and two permissible scores 240-3 associated with the sole attribute 230 associated with HA tenet 210-3.

The sum of scores for each attribute associated with a particular tenet 210 may be referred to as the tenet score. As depicted in FIG. 2, the maximum permissible attribute scores for each attribute may be determined such that the maximum permissible tenet score is 100. i.e., the maximum permissible attribute score associated with any tenet 210 equals 100/N where N is the number of attributes 230 associated with the particular tenet. Each permissible score corresponds to a particular assessment of the target application with respect to the applicable attribute. The three permissible scores for each attribute of security tenet 210-1, as an example, may include a minimum score of 0 when the application does not require the attribute, an intermediate score of 10 when the attribute might be desirable, but is not mandatory for the application, and a maximum score of 20 when the attribute is mandatory. Similarly, the two permissible scores for each attribute of density/performance tenet 210-2 may include a minimum score of 0 when the attribute is not required and a maximum score of 25 when the attribute is mandatory. Finally, the two permissible scores for the sole attribute of HA tenet 210-3 incudes a minimum score of 0 when the attribute is not supported or disabled and a maximum score of 100 when the attribute is supported or enabled.

Figure 3:
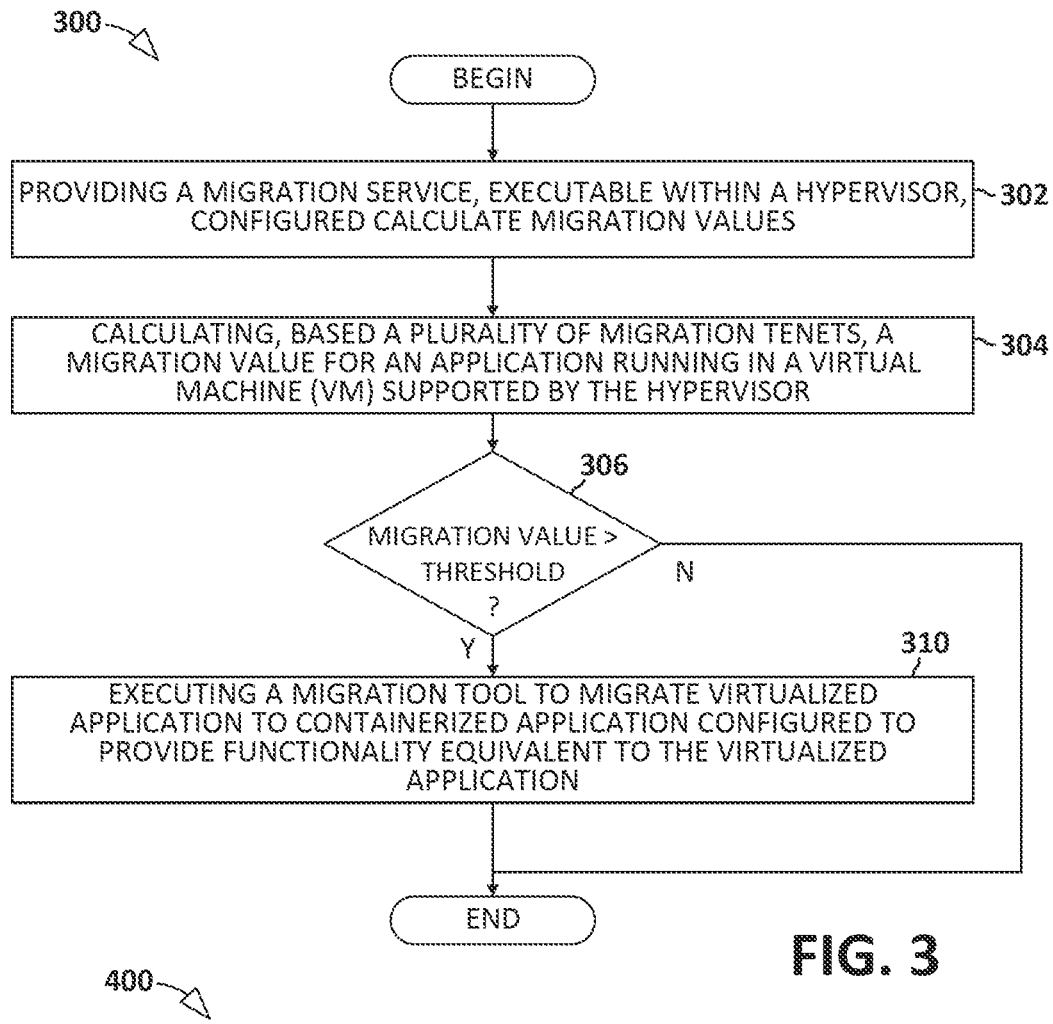
FIG. 3 illustrates a flow diagram of a method for evaluating a VM-based application and, when appropriate, migrating the application to a container deployment.

Referring now to FIG. 3, a method 300 for evaluating virtualized applications for possible containerization is illustrated in flow diagram format. The illustrated method 300 includes providing (block 302) a migration service that executes within a hypervisor and is configured to perform a runtime migration value calculation. The migration service calculates (block 304), based on a subjective assessment of a plurality of migration tenets, a single numeric value, referred to as the migration value, for an application running in a virtual machine (VM) supported by the hypervisor. The illustrated method then determines (block 306) whether the application's migration value exceeds a specified threshold value. Upon detecting that a migration value exceeds the threshold, the illustrated method 300 then invokes (block 310) a migration tool to migrate the virtualized application to a containerized application that configured to provide functionality equivalent or substantially to the virtualized application. As discussed with respect to FIG. 2, the migration value may comprise the sum of a plurality of weighted tenet values corresponding to a plurality of migration tenets including, as non-limiting examples, a security tenet, a performance/density tenet, and an HA tenet. Each tenet may be associated with a corresponding group of attributes and each tenet score may comprise the sum all attribute scores associated with the tenet. As is true for the exemplary template 200 of FIG. 2, the attribute scores may be constrained to produce a maximum tenet score of 100 and the sum of the weightings 220 may be constrained to a value of 100 such that the migration value falls in the range of 0 to 100 wherein a higher score reflect a stronger motivation to migrate the application to a container deployment. In this manner, potentially subjective and inconsistent decisions regarding the VM-to-container migration of specific applications are replaced with a consistent, unambiguous, quantitative assessment based on a well-rounded set of attributes and tenets.

Figure 4:
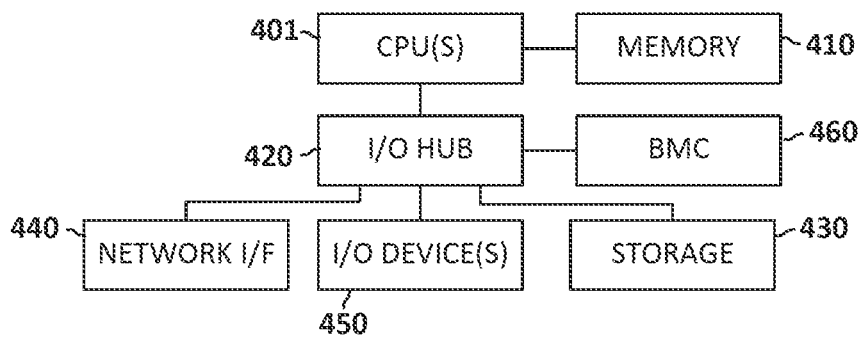
FIG. 4 illustrates an exemplary information handling system suitable for use in conjunction with disclosed methods.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
    providing a migration service, executable within a hypervisor, and configured to calculate, based on a plurality of migration tenets, a migration value for a virtualized application, comprising an application running in virtual machine (VM) supported by the hypervisor; and
    responsive to calculating a migration value exceeding a threshold value, executing a migration tool to migrate the virtualized application to a containerized application comprising one or more containers, wherein the containerized application is configured to provide functionality equivalent to the virtualized application;
    wherein the migration service is configured to calculate the migration value by calculating a plurality of tenet values, wherein the plurality of tenet values include a tenet value corresponding to each of the plurality of migration tenets
    wherein each tenet is associated with a corresponding group of attributes and wherein calculating the tenet values comprises assigning an attribute score to each attribute in the corresponding group of attributes and summing all attribute scores for the group.

2. The method of claim 1, wherein the migration service is configured to assign a weighting to each tenet and wherein the migration value comprises a weighted sum of the tenet values.

3. The method of claim 1, wherein the plurality of tenets includes one or more of:
    a security tenet;
    a performance tenet;
    a density tenet;
    a high availability (HA) tenet; and
    a disaster recovery (DR) tenet.

4. The method of claim 1, wherein assigning an attribute score to each attribute comprises assigning one of a set of predetermined attribute scores.

5. The method of claim 4, wherein the predetermined set of attribute scores is the same for each attribute in the group of attributes.

6. An information handling system comprising:
    a central processing unit (CPU); and
    a non-transitory computer readable memory, including processor executable instructions that, when executed by the CPU, cause the system to perform operations including:
        providing a migration service, executable within a hypervisor, and configured to calculate, based on a plurality of migration tenets, a migration value for a virtualized application, comprising an application running in virtual machine (VM) supported by the hypervisor; and
        responsive to calculating a migration value exceeding a threshold value, executing a migration tool to migrate the virtualized application to a containerized application comprising one or more containers, wherein the containerized application is configured to provide functionality equivalent to the virtualized application;
        wherein the migration service is configured to calculate the migration value by calculating a plurality of tenet values, wherein the plurality of tenet values include a tenet value corresponding to each of the plurality of migration tenets
        wherein each tenet is associated with a corresponding group of attributes and wherein calculating the tenet values comprises assigning an attribute score to each attribute in the corresponding group of attributes and summing all attribute scores for the group.

7. The information handling system of claim 6, wherein the migration service is configured to assign a weighting to each tenet and wherein the migration value comprises a weighted sum of the tenet values.

8. The information handling system of claim 6, wherein the plurality of tenets includes one or more of:
    a security tenet;
    a performance tenet;
    a density tenet;
    a high availability (HA) tenet; and
    a disaster recovery (DR) tenet.

9. The information handling system of claim 8, wherein assigning an attribute score to each attribute comprises assigning one of a set of predetermined attribute scores.

10. The information handling system of claim 9, wherein the predetermined set of attribute scores is the same for each attribute in the group of attributes.

11. A non-transitory computer readable medium including processor executable instructions that, when executed by a processor of an information handling system, cause the system to perform operations comprising:
    a central processing unit (CPU); and
    a non-transitory computer readable memory, including processor executable instructions that, when executed by the CPU, cause the system to perform operations including:
        providing a migration service, executable within a hypervisor, and configured to calculate, based on a plurality of migration tenets, a migration value for a virtualized application, comprising an application running in virtual machine (VM) supported by the hypervisor; and
        responsive to calculating a migration value exceeding a threshold value, executing a migration tool to migrate the virtualized application to a containerized application comprising one or more containers, wherein the containerized application is configured to provide functionality equivalent to the virtualized application;
        wherein the migration service is configured to calculate the migration value by calculating a plurality of tenet values, wherein the plurality of tenet values include a tenet value corresponding to each of the plurality of migration tenets
        wherein each tenet is associated with a corresponding group of attributes and wherein calculating the tenet values comprises assigning an attribute score to each attribute in the corresponding group of attributes and summing all attribute scores for the group.

12. The non-transitory computer readable medium of claim 11, wherein the migration service is configured to assign a weighting to each tenet and wherein the migration value comprises a weighted sum of the tenet values.

13. The non-transitory computer readable medium of claim 11, wherein the plurality of tenets includes one or more of:
- a security tenet;
- a performance tenet;
- a density tenet;
- a high availability (HA) tenet; and
- a disaster recovery (DR) tenet.

14. The non-transitory computer readable medium of claim 11, wherein assigning an attribute score to each attribute comprises assigning one of a set of predetermined attribute scores.

* * * * *